United States Patent
Akiyama et al.

(10) Patent No.: US 6,754,038 B2
(45) Date of Patent: Jun. 22, 2004

(54) LIBRARY APPARATUS HAVING PRESSING DEVICE FOR CORRECTING ALIGNMENT OF A LEADER BLOCK ON A CARTRIDGE TAPE

(75) Inventors: Hitomi Akiyama, Kawasaki (JP); Yoshiki Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 54 days.

(21) Appl. No.: 09/766,223

(22) Filed: Jan. 19, 2001

(65) Prior Publication Data

US 2001/0008472 A1 Jul. 19, 2001

(30) Foreign Application Priority Data

Jan. 19, 2000 (JP) .................................... 2000-010994

(51) Int. Cl.[7] ............................................. G11B 15/68
(52) U.S. Cl. ........................................................ 360/92
(58) Field of Search ........................................... 360/92

(56) References Cited

U.S. PATENT DOCUMENTS 4,991,037 A * 2/1991 Shimizu et al. ............... 360/71
5,781,369 A * 7/1998 Inazawa et al. ............... 360/69
5,793,563 A * 8/1998 Katsuyama et al. ......... 242/337
6,172,833 B1 * 1/2001 Fry et al. ........................ 360/71

* cited by examiner

Primary Examiner—George J. Letscher
Assistant Examiner—Mark S Blouin
(74) Attorney, Agent, or Firm—Greer, Burns & Crain, Ltd.

(57) ABSTRACT

A library apparatus is adapted to write to and read from a plurality of cartridges each housing a tape wound around a reel. The tape has a leader block attached to a tip thereof for pulling the tape out of its cartridge and adapted to be seated in a leader block latch provided on the cartridge. The apparatus includes a cell unit having a plurality of cells for storing the tape cartridges, a threader unit for writing data to and/or reading data from a selected cartridge. The threader unit has a pin for engaging the leader block and pulling the tape out of the cartridge for writing and/or reading data on the tape. A loading unit is connected to the threader unit for holding the cartridge in a first position where the pin is prevented from engaging the leader block of the cartridge, and a second position where the pin is allowed to engage the leader block and write and/or read from the tape. An accessor transfers the cartridge between the cell unit and the first position of the loading unit.

13 Claims, 18 Drawing Sheets

FIG. 22
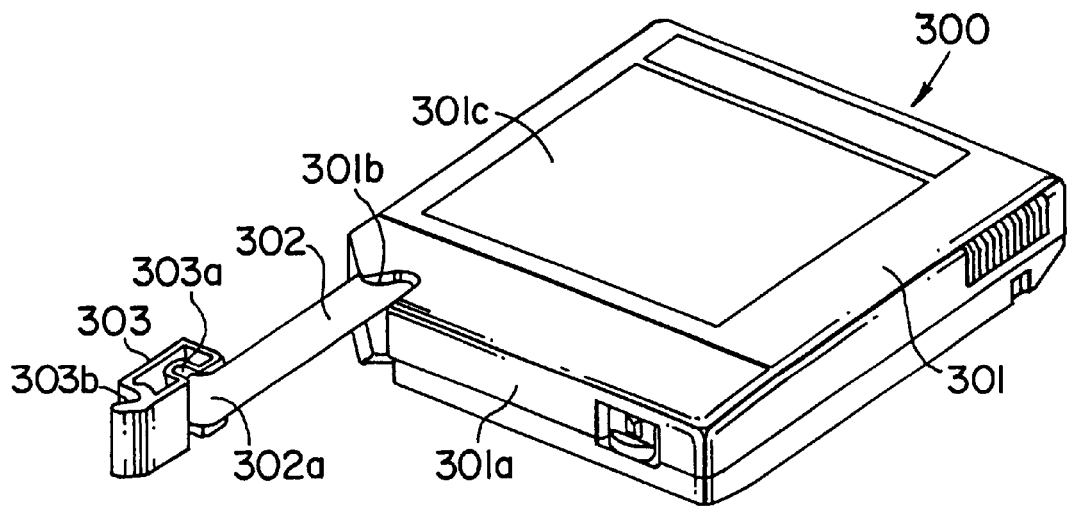
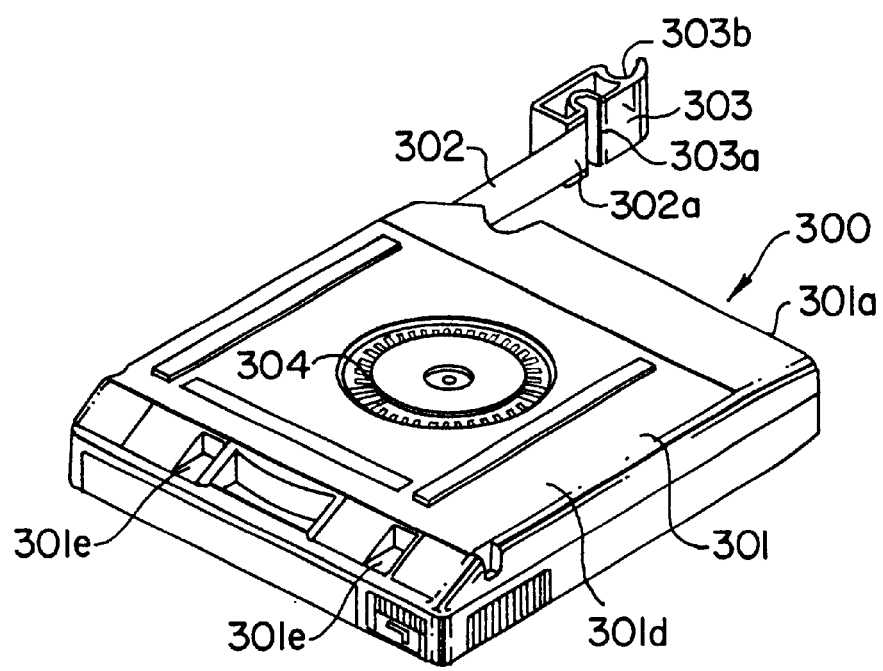
FIG. 23

LIBRARY APPARATUS HAVING PRESSING DEVICE FOR CORRECTING ALIGNMENT OF A LEADER BLOCK ON A CARTRIDGE TAPE

The present invention relates to a library apparatus that reads and writes data from and to a magnetic cartridge tape used as the recording medium, and particularly to a library apparatus adapted to correct the alignment of a leader block attached to the leading end of a recording tape, so that the tape can be pulled out of its cartridge by the leader block.

BACKGROUND OF THE INVENTION

Some computer systems include at least one library apparatus which stores a plurality of magnetic tape cartridges in the racks of its cell units. In this type of library apparatus, after the desired cartridge is ejected from a rack in response to a command from the computer and is set in a magnetic tape apparatus, backup data are written to or read from the cartridge.

FIG. 21 is a schematic of the structure of a conventional library apparatus. In this drawing, auto cartridge loader (ACL) 10 includes a cell unit (not shown in FIG. 21) for storing a plurality of cartridges 300 shown in FIGS. 22 and 23, and an accessor mechanism (ACC) (not shown in FIG. 21) that automatically transfers a cartridge 300 to the cell unit or a magnetic tape unit (MTU) 20, to be described later, in response to commands from the computer (not shown).

The cell unit described above is constructed from a plurality of racks called cells. The cartridges 300 are stored in these cells. The ACC ejects a cartridge 300 from the desired cell in the cell unit in response to commands from the computer and automatically transfers it to the MTU 20. In addition, the ACC ejects a cartridge 300 from the MTU 20 and automatically transfers it to a cell in the cell unit.

FIG. 22 is a perspective view showing the structure of the cartridge 300 in an upright state. FIG. 23 is a perspective view showing the structure when the cartridge 300 has been turned over. A cartridge case 301 of the cartridge 300 has a generally box shape and accommodates a tape 302, which is the magnetic recording medium, wound around a tape reel 304. Data is written to or read from this tape 302 by the MTU 20.

A cartridge top 301c of the cartridge case 301 is formed from a transparent resin. Thus, the tape 302 wound around the tape reel 304 can be checked from the outside through the cartridge top 301c. A leader block latch 301b is an opening formed on the left side of a side surface 301a and functions as a leader port to pull out the tape 302 from the cartridge 300 and to latch or hold a leader block 303 to the cartridge case 301.

The leader block 303 is attached to a tip 302a of the tape 302 and is the member that engages a threader pin 234 (shown in FIG. 24A) when the tape 302 is pulled out of the cartridge 300 and when the pulled out tape 302 is stored back in the cartridge 300. The tape tip 302a is attached and fixed to a tape tip mount 303a. The threader pin latch 303b is formed to have a nearly hook-shaped cross-section to engage the threader pin 234.

In the above structure, in response to commands from the computer, the ACC of the ACL 10 ejects a cartridge 300 from the desired cell in the cell unit and automatically transfers it to a transfer position on the MTU 20. The threader pin 234 is positioned at the initial position in the MTU 20 as shown in FIG. 25A. Then the MTU 20 loads the cartridge 300 from the transfer position to a read/write position, where the threader pin latch 303b of the leader block 303 engages the threader pin 234 as shown in FIG. 25A. Next, as shown in FIG. 25B, under the control of the MTU 20, the tape reel 304 is rotated forward by a motor (not shown), and the tape 302 is pulled out of the cartridge 300 by the motion of the threader pin 234 in the X+ direction. Then the MTU 20 reads from or writes to the tape 302.

When the reading or the writing process on the tape 302 is finished, the tape reel 304 is rotated backwards by a motor (not shown), and the tape 302 is wound back inside the cartridge 300 by the motion of the threader pin 234 in the opposite direction to the X+ direction.

Next, the MTU 20 unloads the cartridge 300 from the read/write position to the transfer position. The ACC in the ACL 10 ejects the cartridge 300 from the MTU 20 and automatically transfers it to the desired cell of the cell unit in the ACL 10. Thus, the cartridge 300 is stored in a cell.

At times, the leader block 303 separates from the tape 302 in a conventional library apparatus because of pressure applied from the outside or deterioration over time. Usually, the leader block 303 can be reattached to the tape 302 by using a special tool. Often, however, the leader block 303 may be attached improperly at an incline with respect to the tape 302 as shown in FIG. 24A.

Consequently, the leader block 303 could slip and separate from the threader pin 234 while the tape 302 is being pulled out of the cartridge 300 by the threader pin 234. Typically, when this occurs, after the tape 302 is temporarily stored back in the cartridge 300 and the cartridge is unloaded from the MTU 20, then the cartridge 300 is reloaded and a retry of the read or write process is performed. That is, when a leader block slip occurs, the tape reel 304 is rotated to store the tape 302 back in the cartridge 300. As shown in FIG. 24C, however, the leader block 303 does not fully latch to the leader block latch 301b (best shown in FIG. 22) because the leader block is mounted at an incline with respect to the tape 302. Next, the threader pin 234 moves towards the leader block 303 in the X− direction. As shown in FIG. 24D, the threader pin 234 does not properly engage the leader block 303 because the leader block has not engaged the leader block latch 301b properly. As a result, the threader pin 234 and its supporting parts could become damaged when the threader pin collides with the leader block 303, requiring not only the threader pin 234, but other related parts to be replaced, which increases maintenance costs.

In the properly attached state, if a retry is performed with the leader block 303 attached to the tape 302, the leader block will be fully latched to the leader block latch 301b. Therefore, the threader pin 234 will not collide with the leader block 303.

Another problem associated with a conventional library apparatus is that the driving force of the motor (not shown) that rotates the tape reel 304 backwards becomes weaker over time due to deterioration. As a result, the leader block 303 incompletely latches to the leader block latch 301b when the tape 302 is wound in the cartridge 300. In this case, since the leader block 303 of the cartridge 300 is stored in a cell in an incompletely latched state, the leader block 303 must be pushed into the leader block latch 301b, which is a serious problem in maintenance management.

Accordingly, one object of this invention is to provide improved library apparatus which prevents a threader pin from colliding with and damaging the leader block of a tape cartridge.

Another object of this invention is to provide improved library apparatus having a magnetic tape unit which holds a cartridge in a position where the threader pin is prevented from colliding with and damaging the leader block of the cartridge.

Yet another object of this invention is to provide improved library apparatus having a pressing device which is adapted to push the leader block into a latch provided on the cartridge.

SUMMARY OF THE INVENTION

In keeping with one aspect of this invention, a library apparatus is adapted to write to and read from a plurality of cartridges each housing a tape wound around a reel. The tape has a leader block attached to a tip thereof for pulling the tape out of its cartridge and adapted to be seated in a leader block latch provided on the cartridge. The apparatus includes a cell unit having a plurality of cells for storing the tape cartridges, a threader unit for writing data to and/or reading data from a selected cartridge. The threader unit has a pin for engaging the leader block and pulling the tape out of the cartridge for writing and/or reading data on the tape. A loading unit is connected to the threader unit for holding the cartridge in a first position where the pin is prevented from engaging the leader block of the cartridge, and a second position where the pin is allowed to engage the leader block. An accessor transfers the cartridge between the cell unit and the first position of the loading unit. Also included in the apparatus is a feature for determining whether the pin has properly engaged the leader block of the cartridge in the second position, and a pressing device for pushing the leader block into proper alignment when it is determined that the pin has not properly engaged the leader block.

BRIEF DESCRIPTION OF THE DRAWINGS

The above-mentioned and other features of this invention and the manner of obtaining them will become more apparent, and will be best understood by reference to the following description, taken in conjunction with the accompanying drawings in which:

FIG. 22 is a perspective top view of a cartridge used in the library apparatus.

FIG. 23 is a perspective bottom view of the cartridge shown in FIG. 22.

DETAILED DESCRIPTION

Figure 1:
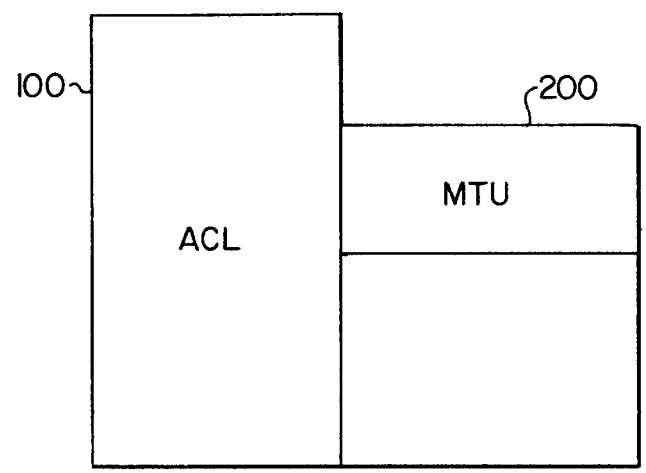
FIG. 1 is a block diagram of a library apparatus of the present invention.
Figure 2:
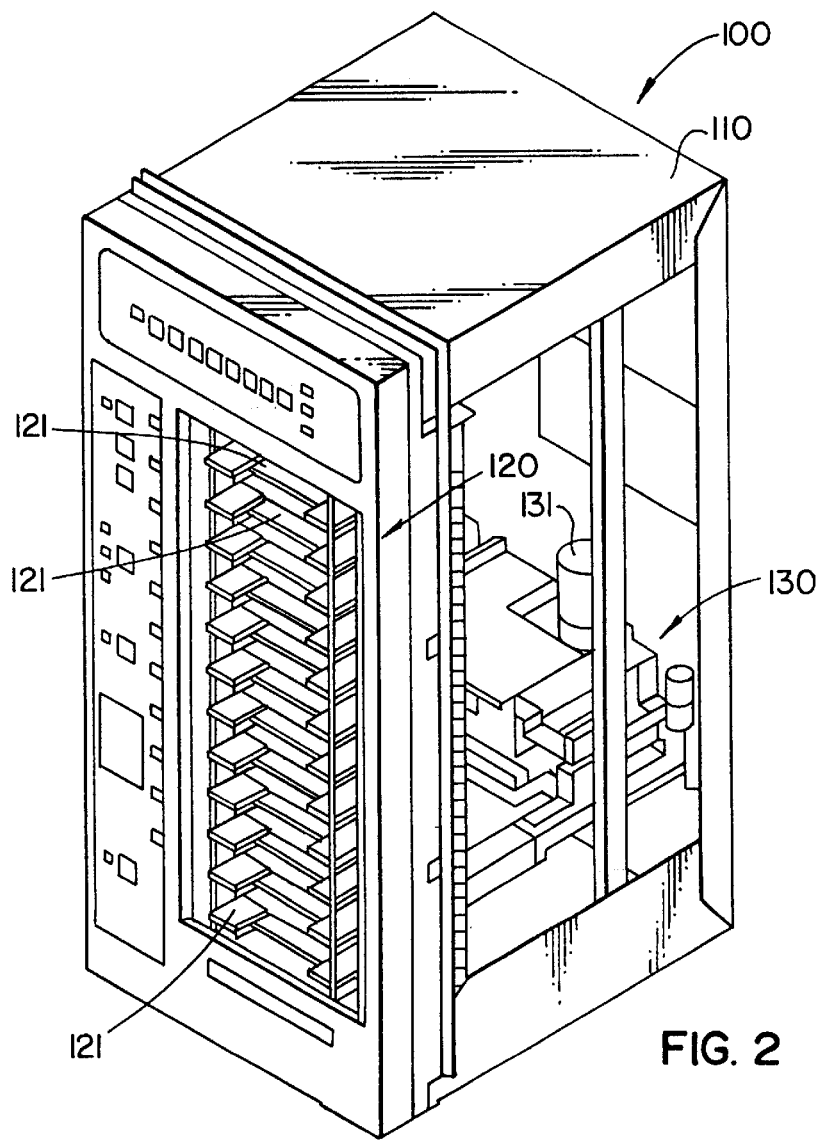
FIG. 2 is a perspective view of an automatic cartridge loader shown in FIG. 1.

Referring to FIGS. 1 and 2, an automatic cartridge loader (ACL) 100 includes a cell unit 120 that stores a plurality of cartridges 300 (shown in FIG. 22) and an accessor unit (ACC) 130 that automatically transfers the cartridges 300 to the cell unit 120 or a magnetic tape unit (MTU) 200 in response to commands from a host device such as a computer (not shown).

The cell unit 120 is constructed from a plurality of racks called cells 121 that are arranged at prescribed intervals in the vertical direction. The cartridge 300 is adapted to be stored in each cell 121. The ACC 130 ejects one cartridge 300 from the desired cell 121 of the cell unit 120 in response to commands from the computer and automatically transfers the cartridge to a loader 220 in the MTU 200 (shown in FIG. 6). The ACC 130 also ejects the cartridge 300 from the loader 220 and automatically transfers it to a selected cell 121 in the cell unit 120.

Figure 3:
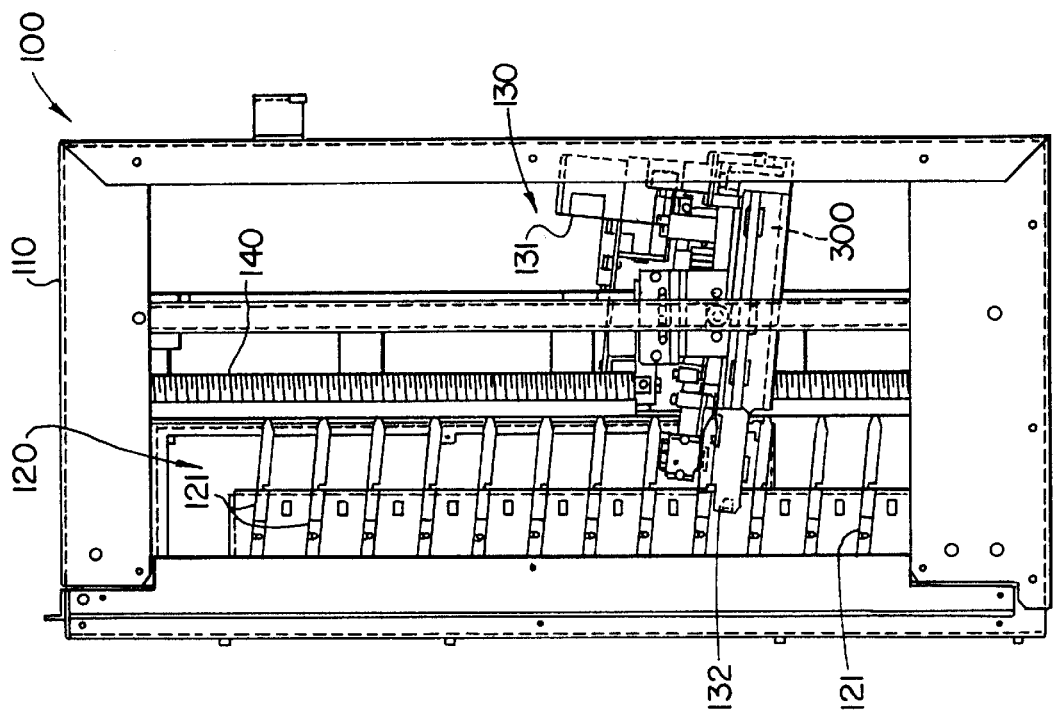
FIG. 3 is a side view of the structure of the automatic cartridge loader of FIG. 2.
Figure 5A:
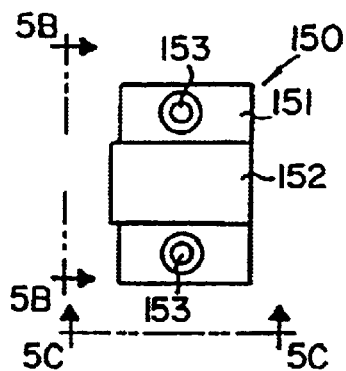
FIG. 5A is a plan view showing the structure of a pressing member of the present invention.
Figure 5B:
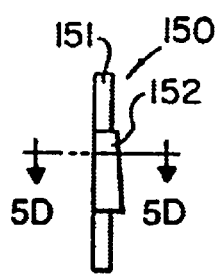
FIG. 5B is a side view of the pressing member of FIG. 5A along direction 5B.
Figure 5D:
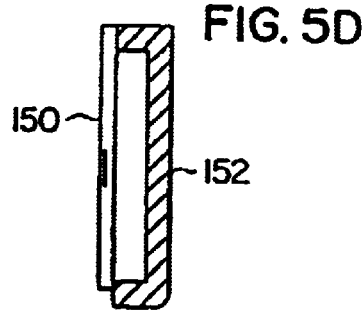
FIG. 5D is a cross-sectional view of the pressing member along line 5D—5D shown in FIG. 5B.
Figure 5C:
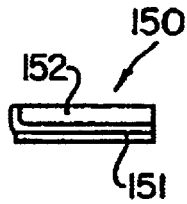
FIG. 5C is a side view of the pressing member of FIG. 5A along direction 5C.
Figure 5E:
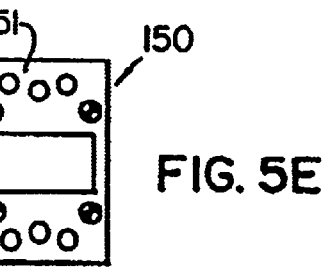
FIG. 5E is a back view showing the structure of the pressing member of FIG. 5A.
Figure 15:
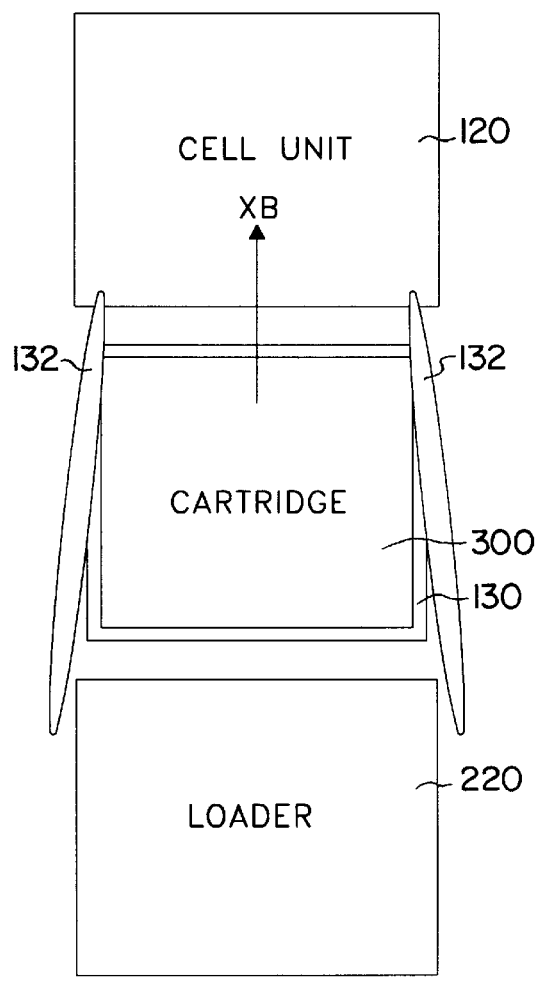
FIG. 15 illustrates the catcher closing operation of the embodiment shown in FIG. 14.

Referring now to FIG. 3, a drive source is provided for raising or lowering the ACC 130 along the shaft 140 installed vertically in the cabinet 110. A pair of catcher hands 132 are installed one on both sides of the ACC 130 (best shown in FIG. 13). These catcher hands 132 open (shown in FIG. 14) and close (shown in FIG. 15) with the center of rotation axis as the center of rotation to grasp and release the cartridge 300, and are driven by a catcher motor 131.

Figure 4:
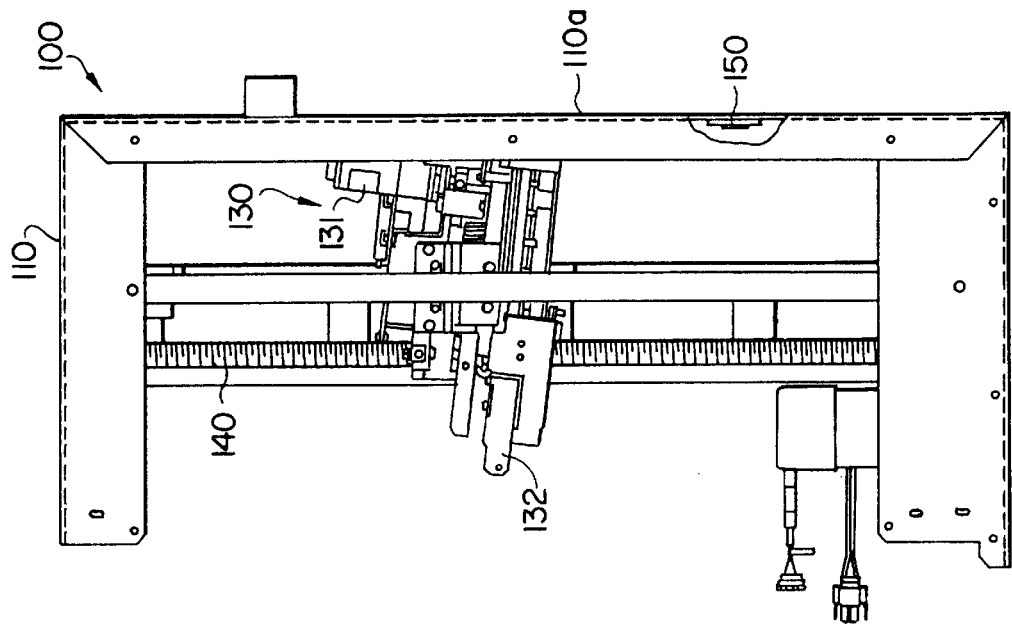
FIG. 4 is of the structure of the automatic cartridge loader of FIG. 3 with parts removed for clarity.

Referring now to FIG. 4, a pressing member 150 is attached to the side member 110a of the cabinet 110. The pressing member 150 is adapted to press the leader block 303 against the leader block latch 301b when the leader block of the cartridge 300 (shown in FIG. 22A) is not completely latched to the leader block latch 301b, or the leader block 303 has slipped off the leader block latch 301b. The installation height of the pressing member 150 is the same height as a specified cell 121B as shown in FIG. 18.

Referring now to FIGS. 5A to 5E, the pressing member 150 includes a plate 151 and generally convex member 152 formed in the center of the plate. A pair of holes 153, 153 for installing the pressing member 150 to the side member 110a (shown in FIG. 4) are formed on both sides of the plate 151. The pressing member 150 is attached to the side member 110a by inserting screws in the holes 153, 153.

Figure 18:
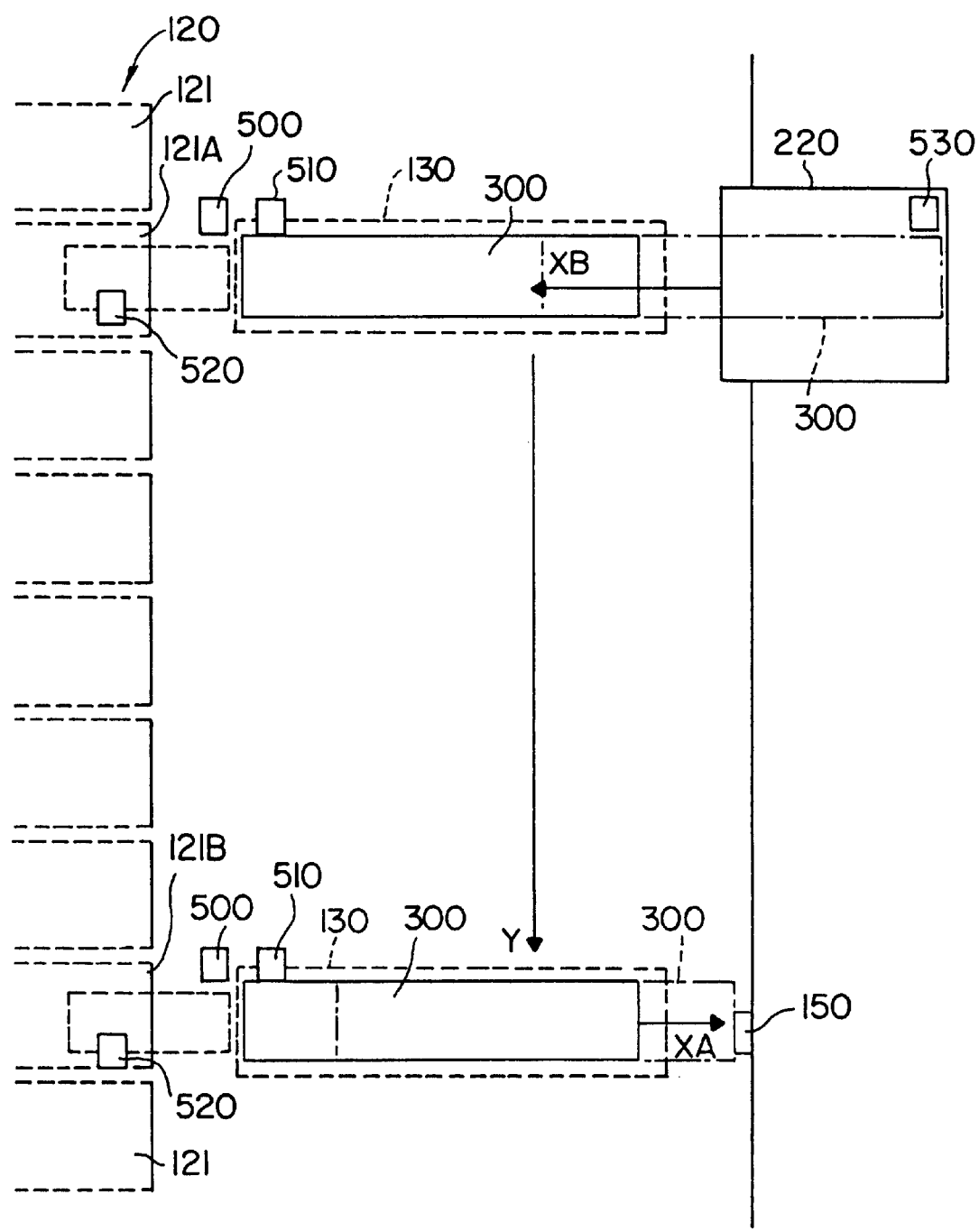
FIG. 18 illustrates an operation for transferring a cartridge to a pressing member.

Turning now to FIG. 18, a first cell side sensor 500 and a second cell side sensor 510 are provided in the ACC 130 for detecting the presence or absence of a cartridge 300 in the ACC. In FIG. 18, the reference numbers of cell 121A and cell 121B are used to specify particular cells from the plurality of cells 121. An unload sensor 520 is provided in each cell 121 to detect whether the cartridge 300 has been unloaded (ejected) from the cells 121.

Figure 6:
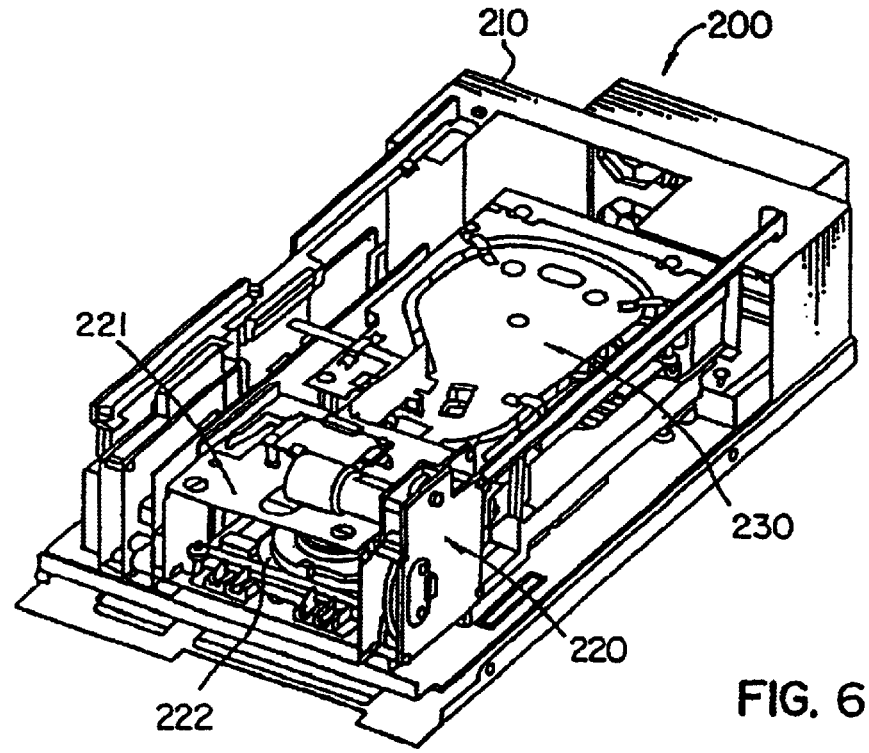
FIG. 6 is a perspective view of a magnetic tape unit shown in FIG. 1.

Turning to FIG. 6, the MTU 200 is comprised of a cabinet 210, the loader 220, and a threader 230. The loader 220 is housed in the cabinet and loads the cartridge 300 transferred by the ACC 130 from a transfer position to the threader 230. The loader 220 also unloads the cartridge 300 from the threader 230 to the transfer position. As shown in FIG. 18, the height of the loader 220 is the same as the height of the specified cell 121A.

Figure 7:
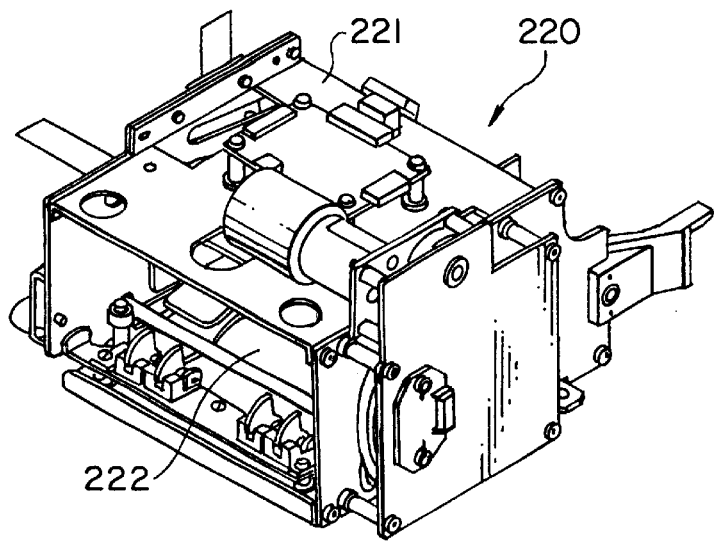
FIG. 7 is a perspective view of a loader of the present invention.

As shown in FIG. 7, the loader 220 includes a cabinet 221 that houses the drive mechanism to load and unload the cartridge 300, and a loader opening 222 as the delivery opening for the cartridge 300. A cartridge sensor 530 (shown in FIG. 18) is installed in the loader 220 to detect the presence or absence of the cartridge 300 in the loader 220. As shown in FIG. 6, the threader 230 is placed close to the loader 220 in the cabinet 210. After the tape 302 is pulled out of the cartridge 300 loaded by the loader 220, the threader 230 reads from or writes to this tape 302.

Figure 8A:
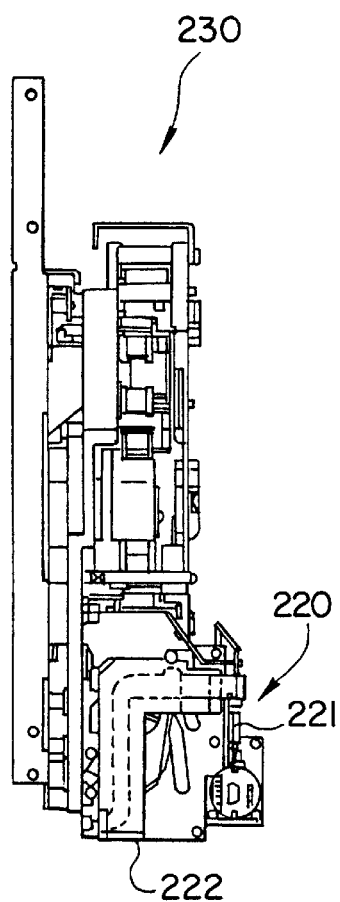
FIG. 8A is a side view of a threader of the present invention shown in FIG. 6.
Figure 8B:
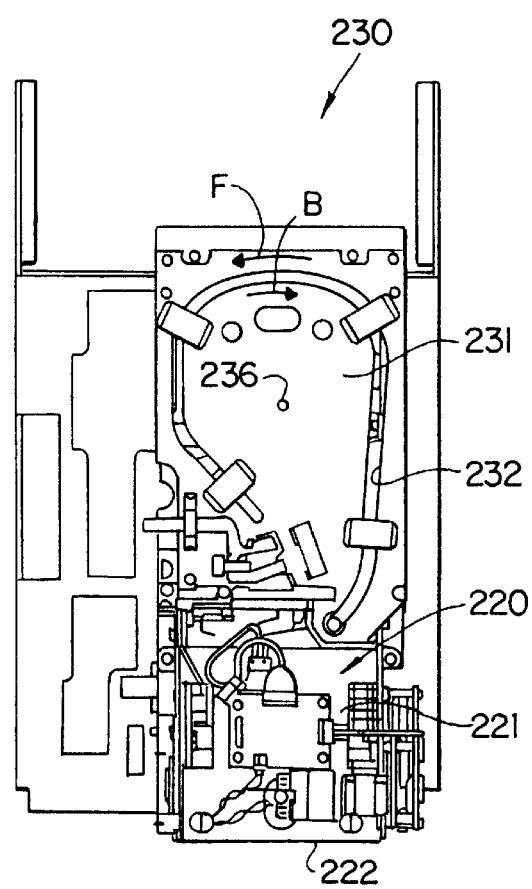
FIG. 8B is a plan view of the threader of FIG. 8A.
Figure 9:
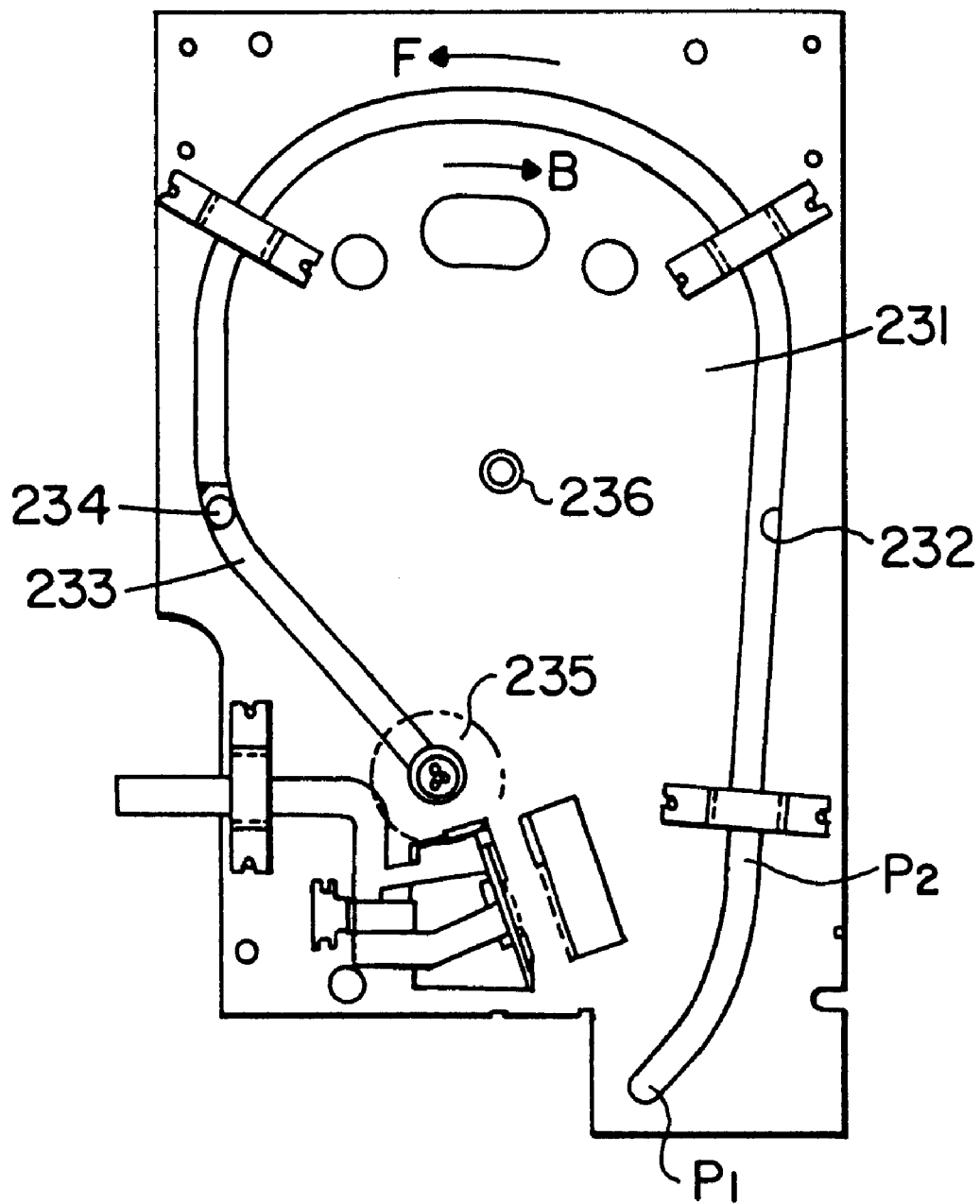
FIG. 9 is a plan view of the threader of FIG. 8A, with parts removed for clarity.

Referring to FIGS. 8A, 8B and 9, the threader 230 includes a threader groove 232 formed in a path almost entirely around the threader surface 231. The tape 302 of the cartridge 300 is moved in the forward direction F or the backward direction B along the threader groove 232 (best shown in FIG. 9). A threader arm 233 is moved in the forward direction F or the backward direction B by a drive mechanism (not shown) along the threader groove 232. The threader pin 234 is installed vertically at the end of this threader arm 233.

The threader pin 234 engages the leader block 303 when the tape 302 is pulled out of the cartridge 300 (shown in FIGS. 25A and 25B) or when the pulled out tape 302 is accommodated back in the cartridge 300. That is, the tape 302 is moved in the forward direction F or the backward direction B along the threader groove 232 accompanying the motion of the threader pin 234. A flange 235 is provided next to the forward end of the threader groove 232. A screw 236 is installed nearly in the center of the threader surface 231 to fix each part in place.

Next, a cartridge load operation in accordance with the present invention is described. The control of the operation described below is performed by a controller (not shown) that manages the control of the ACL 100 and the MTU 200.

When a command is received from the computer, the ACC 130 of the ACL 100 is raised (or lowered) along the shaft 140 (shown in FIG. 3) and stops at the position of the desired cell 121 in the cell unit 120. Next, the catcher hands 132, 132 (shown in FIG. 13) are placed in a "catcher closed" state (closed on the cell unit 120 side) by the forward rotation drive of the catcher motor 131 to grasp a cartridge 300 with the catcher hands 132, 132.

Figures 13, 14:
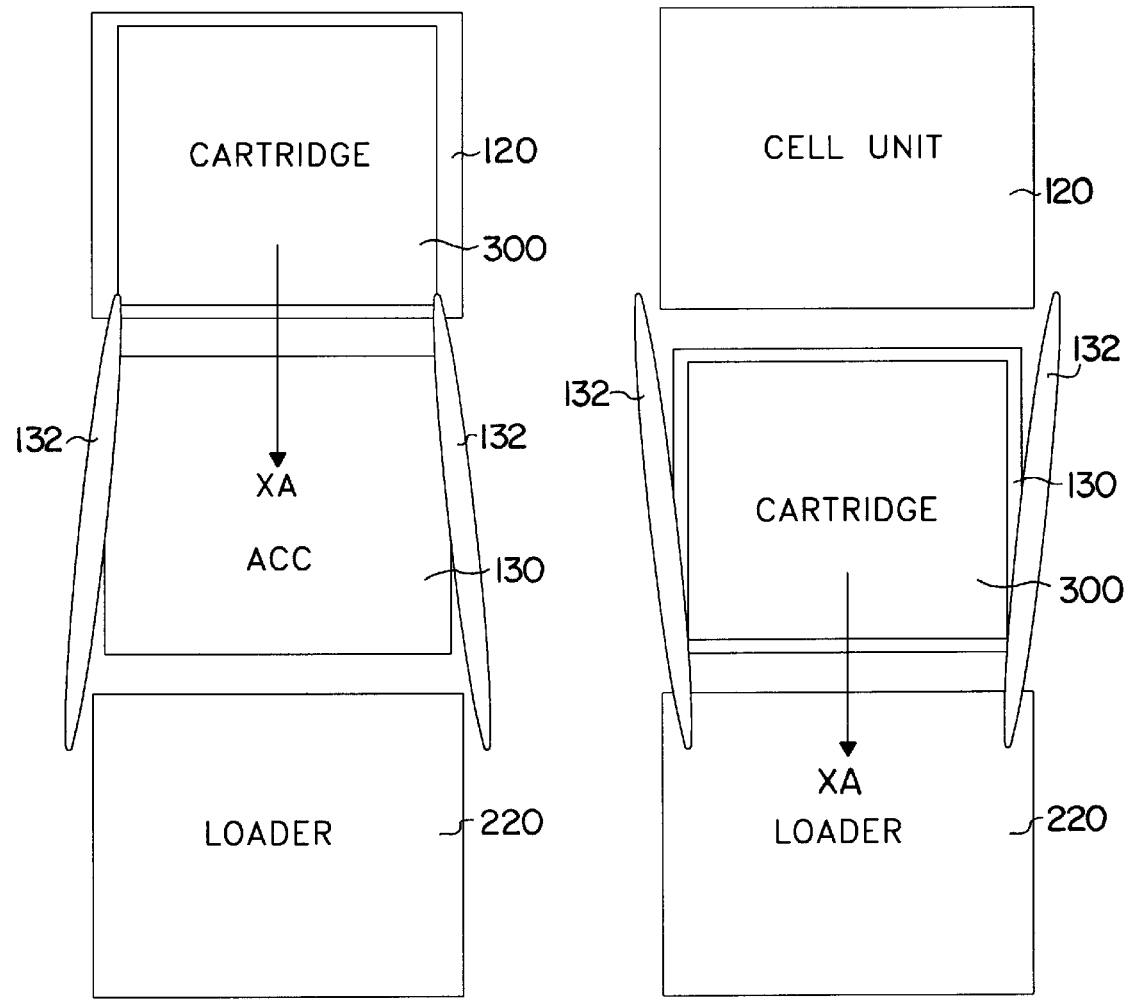
FIG. 13 illustrates a catcher closing operation of the present invention.
FIG. 14 illustrates a catcher opening operation of the present invention.

By rotating the feeder belt (not shown), a frictional force acts between the feeder belt and cartridge 300, and the cartridge 300 is transferred in the XA direction, i.e., in the direction of the loader 220 (as shown in FIG. 13). The presence or absence of a cartridge 300 in the ACC 130 is detected by the first cell side sensor 500 and the second cell side sensor 510 (shown in FIG. 18). Unloading or ejection of the cartridge 300 from inside the cell 121 (for example, cell 121A) is detected by the unload sensor 520.

As shown in FIG. 14, when the cartridge 300 is transferred to the position close to the loader 220, the catcher hands 132, 132 enter a "catcher open" state (open on the cell unit 120 side) by the backward rotation drive of the catcher motor 131. Then the cartridge 300 is inserted in the loader opening 222 of the loader 220 (shown in FIG. 6) and is detected by the cartridge sensor 530 (shown in FIG. 18).

Figure 25A:
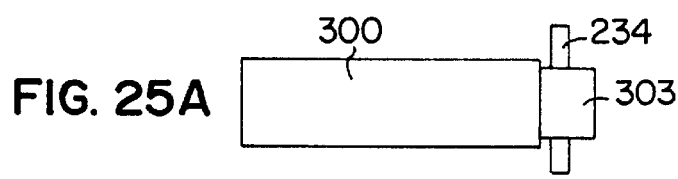
FIGS. 25A–25B illustrate an operation for pulling the tape out of a cartridge.

Referring back to FIG. 9, the threader pin 234 is positioned initially at the initial position $P_1$. The loader 220 in FIG. 6 performs a "loader down" operation in which the cartridge 300 is loaded from a transfer position to a read/write position of the threader 230. The read/write position (the position indicated by the dashed line in FIG. 20D) is a lower position than the transfer position (the position indicated by the solid line in FIG. 20D). In the loader down operation, the cartridge 300 is lowered down at an incline to the right from the transfer position to the read/write position and is set in the threader 230. As a result, the threader pin latch 303b (shown in FIG. 22) of the leader block 303 engages the threader pin 234 as shown in FIG. 25A.

Figure 10:
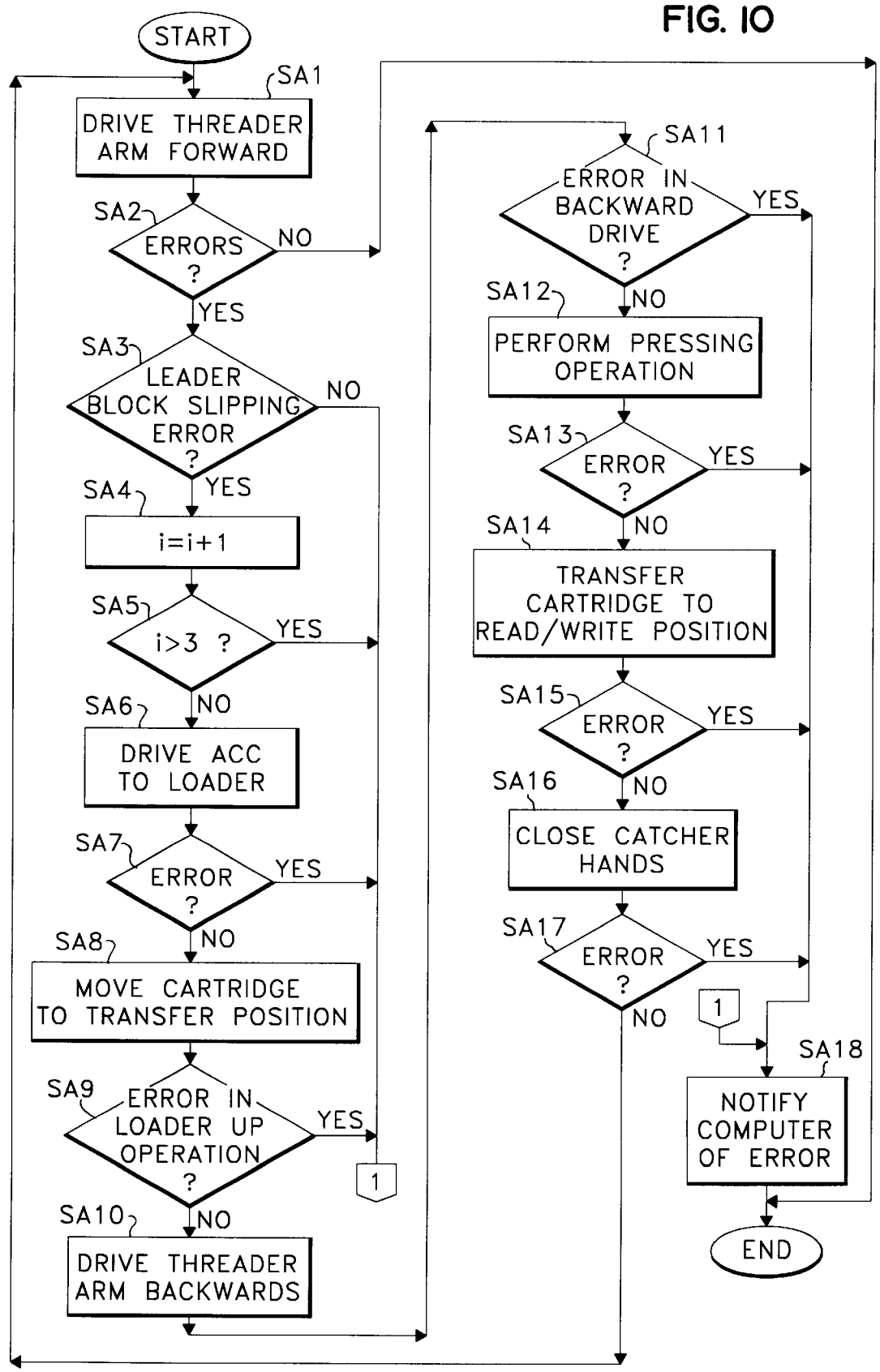
FIG. 10 is a flow chart illustrating a cartridge loading operation of the present invention.

Referring now to FIG. 10, the threader arm 233 along with the threader pin 234 are driven forward (step SA1). It is then determined whether errors such as the leader block 303 slipping off as described earlier or no movement of the threader arm 233 have occurred in the forward drive (step SA2). If no error has occurred, the threader arm 233, and the threader pin 234 are moved in the forward direction F along the threader groove 232 (shown in FIG. 9). Thus, the threader pin 234 is moved from the initial position $P_1$ to position $P_2$. Accompanying this motion, the tape 302 is pulled out of the cartridge 300, and data is read from or written on the tape.

If an error has occurred, it is determined whether a leader block has slipped off the threader pin 234 (step SA3). This sometimes occurs when the leader block 303 is attached at an incline with respect to the tape 302 as shown above in FIG. 20A. If the distance of movement of the threader pin 234 and the number of rotations of the tape reel 304 are inconsistent, then it is determined that a leader block slippage has occurred. If a slippage has not occurred, then in step SA18, the computer is notified of the generation of the error.

On the other hand, if a leader block slippage or "leader block slipping error" has occurred, the number "i" of generated leader block slipping errors (initial value of 0) is incremented by one (step SA4). Then, it is decided whether the number "i" of leader block slipping errors generated exceeds some threshold value, for example, 3 (step SA5). If the decision is "Yes," the process in step SA18 (error notification) is executed. If the decision in step SA5 is "No," the ACC 130 is driven to a position in front of the loader 220 in preparation for retrieving the cartridge 300 from the loader (step SA6). It is then decided whether an error has occurred in the drive of the ACC 130 (step SA7). If this decision is "Yes," the process in step SA18 (error notification) is executed.

Figure 20A:
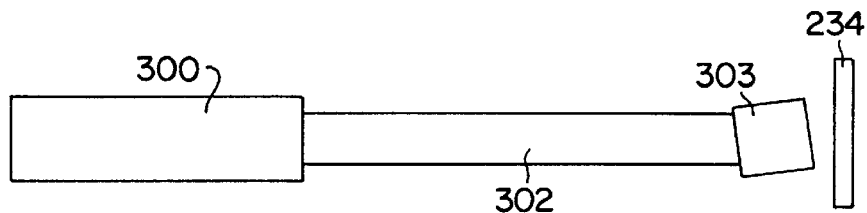
FIGS. 20A–20E illustrate the relative positions of a threader and a leader block when the leader block disengages from the threader in the present invention.
Figure 20B:
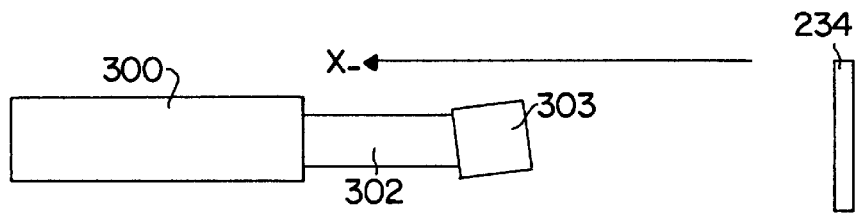
Figure 20C:
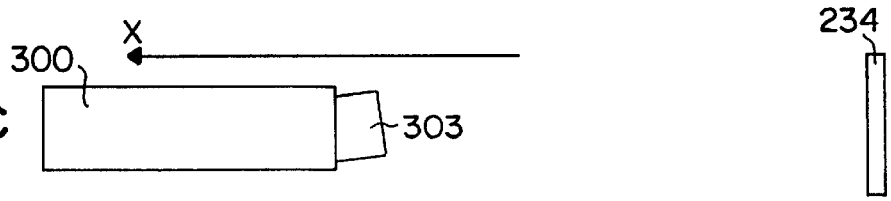
Figure 20D:
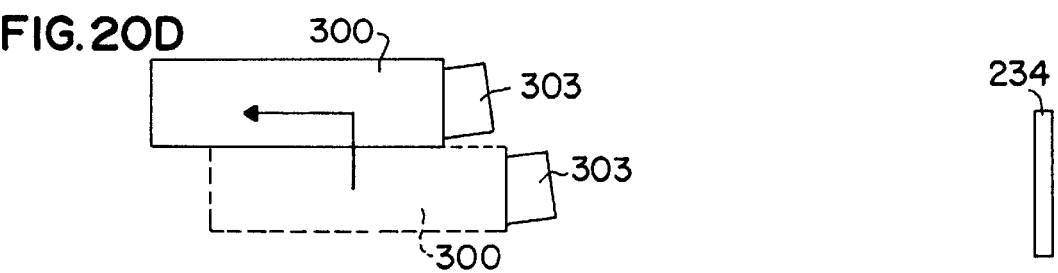

If the decision in step SA7 is "No," then a "loader up" operation is executed in which the cartridge 300 is unloaded from the read/write position to the transfer position as shown in FIG. 20D, after the tape 302 is wound back in the cartridge 300 as shown in FIGS. 20A to 20C (step SA8). In the loader up operation, the cartridge 300 is raised up at an incline to the left from the read/write position (position indicated by the dashed line in FIG. 20D) to the transfer position (position indicated by the solid line).

Specifically, the tape reel 304 (shown in FIG. 23) is rotated backwards by the motor (not shown) to wind the tape 302 in the cartridge 300 (best shown in FIG. 20A to FIG. 20C). Because the leader block 303 is attached at an incline with respect to the tape 302 as shown in FIG. 20D, the leader block 303 does not latch completely to the leader block latch 301b (shown in FIG. 22) and protrudes in the direction of the threader pin 234 from the proper position. Next, the loader 220 raises the cartridge 300 at an incline to the left from the read/write position (position indicated by the dashed line in FIG. 20D) to the transfer position (position indicated by the solid line in FIG. 20D).

Then, it is decided whether errors have occurred in the loader up operation (step SA9). If this decision is "Yes," the process in step SA18 (error notification) is executed. If the decision in step SA9 is "No," the threader arm 233 in FIG. 9 is driven backwards (step SA10).

Further, a determination is made as to whether an error has occurred during the backward drive, such as no movement by the threader arm 233 (step SA11). If the decision is "No," the threader arm 233 (also the threader pin 234) is continued to be moved in the backward direction B along the threader groove 232 (best shown in FIG. 9). Therefore, the threader pin 234, for example, is moved from position $P_2$ to the initial position $P_1$. If the decision in step SA11 is "Yes," the process in step SA18 (error notification) is executed.

Figure 20E:
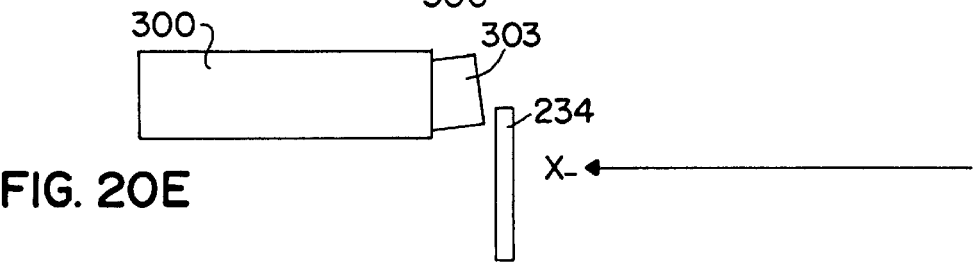
Figure 21:
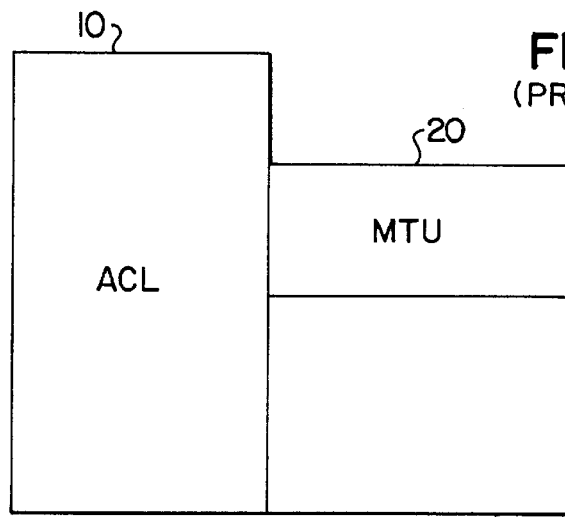
FIG. 21 is a block diagram of a conventional library apparatus.
Figure 24A:
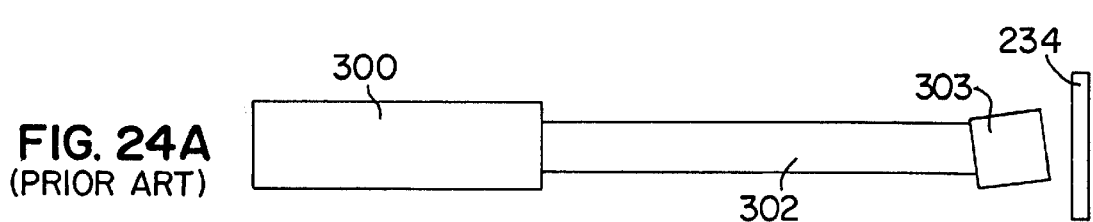
FIGS. 24A–24D illustrate the problems associated with a conventional library apparatus.
Figure 24B:
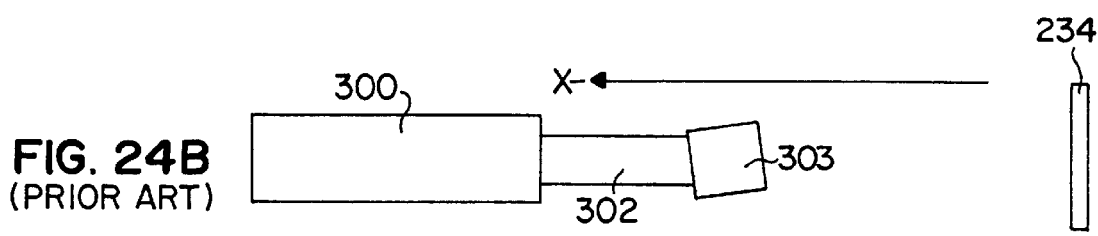
Figure 24C:
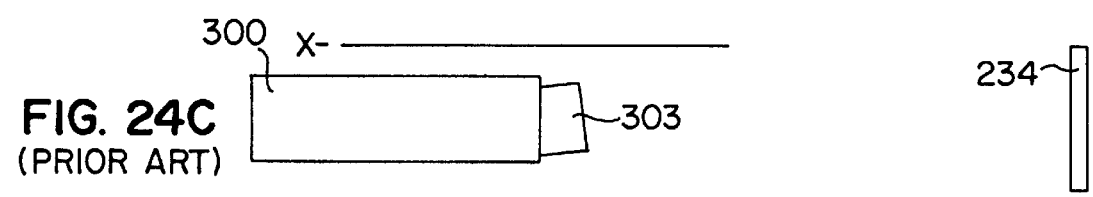
Figure 24D:
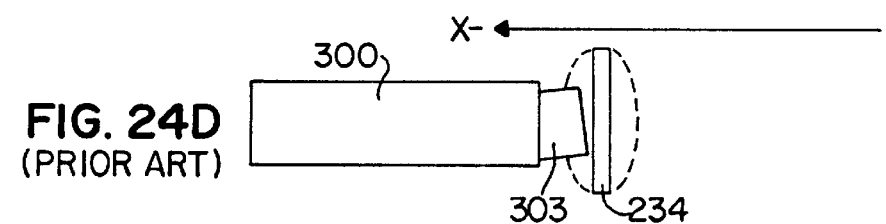

In the state with the threader pin 234 positioned at the initial position $P_1$ (see FIG. 9) as shown in FIG. 20E, the threader pin 234 does not collide with the leader block 303 because the cartridge 300 is positioned in the transfer position. As a result, this embodiment does not have the problem of the leader block 303 colliding with the threader pin 234, as in the conventional library apparatus and shown in FIG. 24D. Subsequently, a pressing operation is performed to press the leader block 303 against the pressing member 150 in FIG. 18 (step SA12).

Figure 11:
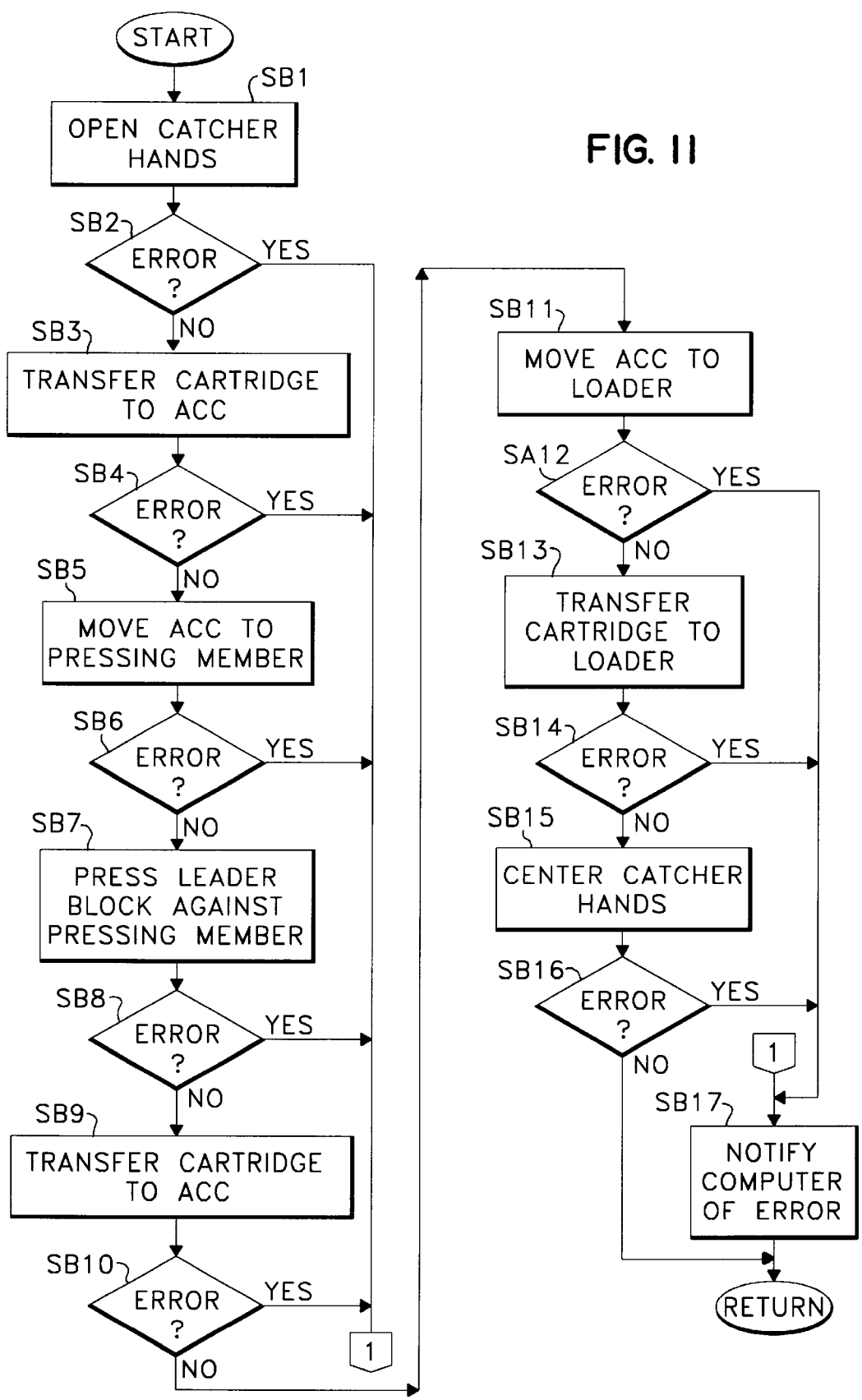
FIG. 11 is a flow chart illustrating the pressing operation described in FIG. 10.
Figure 16:
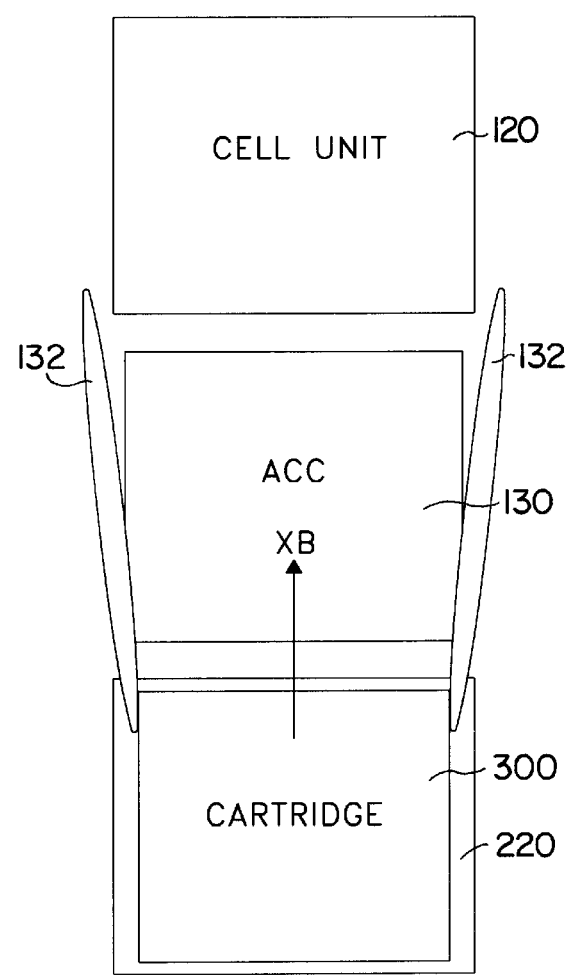
FIG. 16 illustrates the catcher opening operation of the embodiment shown in FIG. 15.

The pressing operation is described in more detail with reference to FIG. 11, where in step SB1, the catcher hands 132, 132 enter the "catcher open" state (open on the cell unit 120 side) as shown in FIG. 16 by the backward drive of the catcher motor 131 (see FIG. 2). The cartridge 300 in the loader 220 is then grasped by the catcher hands 132, 132.

A determination is then made as to whether an error has occurred when opening the catcher (step SB2). If the result is "Yes," the computer is notified about the generation of errors (step SB17). If the decision in step SB2 is "No," then in step SB3, the rotation of the feeder belt (not shown) causes a frictional force to act between the feeder belt on the catcher hands and the cartridge 300 to feed the cartridge towards the cell unit 120. After the cartridge 300 is transferred in the XB direction (the direction of the cell unit 120) from the loader 220 as shown in FIG. 18, it is held in the ACC 130.

In step SB4, if a decision about the generation of errors during the transfer of the cartridge 300 is "Yes," the process in step SB17 (error notification) is executed. If the decision in step SB4 is "No," then in step SB5, the ACC 130 is moved in the Y direction (downward) as in FIG. 18 along the shaft 140 (see FIG. 3) and stopped at the position opposite the pressing member 150. In step SB6, if a decision about the generation of errors during the motion of the ACC 130 is "Yes," the process in step SB17 (error notification) is executed.

If the decision in step SB6 is "No," then in step SB7, the feeder belt is driven to transfer the cartridge 300 in the XA direction (from the position indicated by the solid line to the position indicated by the dot-dashed line in FIG. 18). Thus, the leader block 303 of the cartridge 300 is pressed against the pressing member 150 to completely latch the leader block 303 to the leader block latch 301b. In step SB8, if a decision about the generation of errors related to the pressing motion is "Yes," the process in step SB17 (error notification) is executed.

Figure 19:
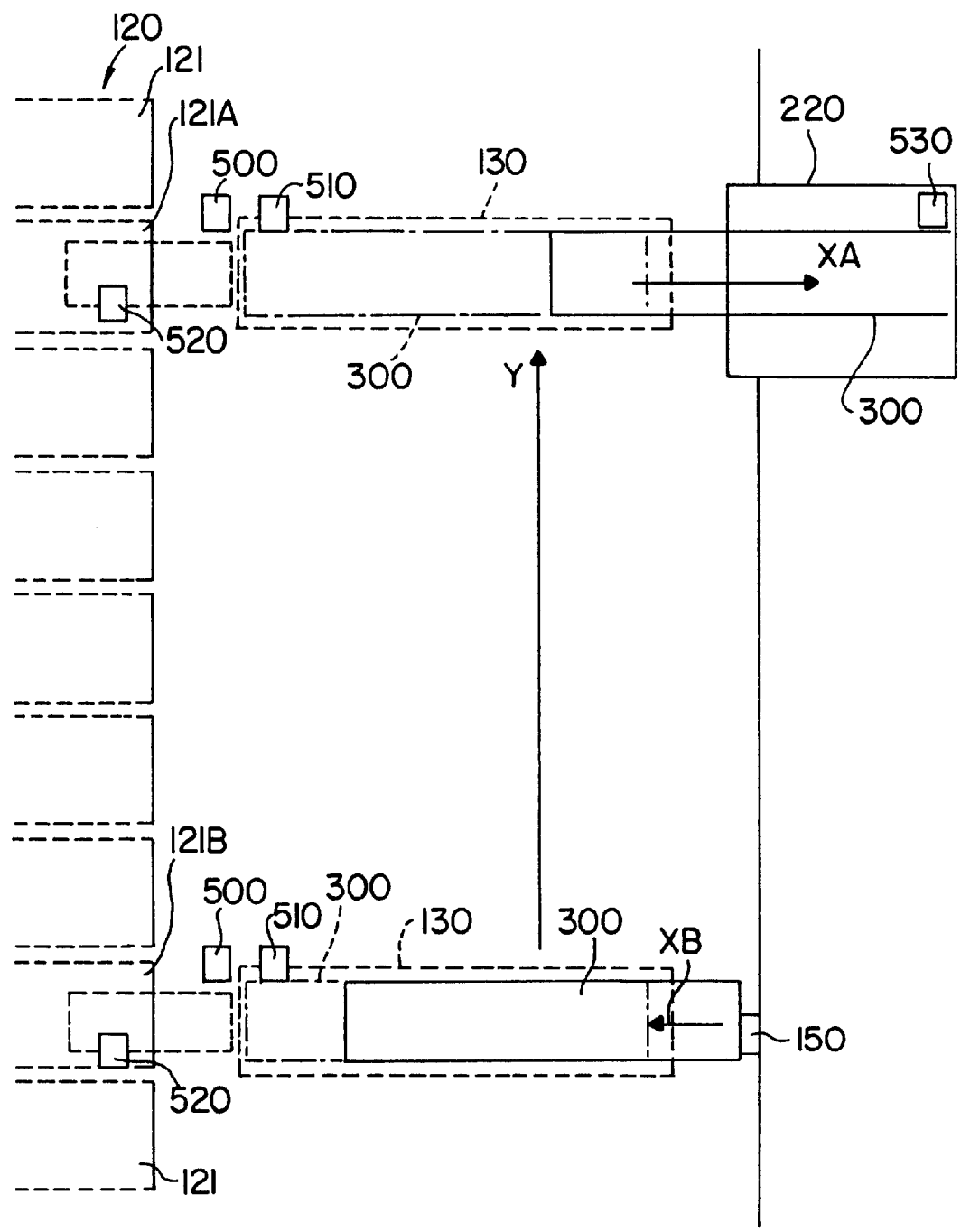
FIG. 19 illustrates an operation for transferring a cartridge to the magnetic tape unit.

If the decision in step SB8 is "No," then in step SB9, the feeder belt is driven to transfer the cartridge 300 in the XB direction away from the pressing member 150, as shown in FIG. 19 (from the position indicated by the solid line to the position indicated by the dot-dashed line) and held in the ACC 130. In step SB10, if a decision about the generation of errors during the transfer of the cartridge 300 is "Yes," the process in step SB17 (error notification) is executed.

If the decision in step SB10 is "No," then in step SB11, the ACC 130 is moved in the Y direction (upward) as shown in FIG. 19 along the shaft 140 (shown in FIG. 3) and stopped at the position opposite the loader 220. In step SB12, if a decision about the generation of errors in the motion of the ACC 130 is "Yes," the process in step SB17 (error notification) is executed.

If the decision in step SB12 is "No," then in step SB13, the feeder belt is driven to transfer the cartridge 300 in the XA direction towards the loader 220 (from the position indicated by the dot-dashed line to the position indicated by the solid line in FIG. 19). This inserts the cartridge 300 back into the loader opening 222 of the loader 220 (shown in FIG. 6) by the feeder belt and is detected by the cartridge sensor 530. The threader pin 234 (shown in FIG. 9) is positioned at the initial position $P_1$.

Figure 17:
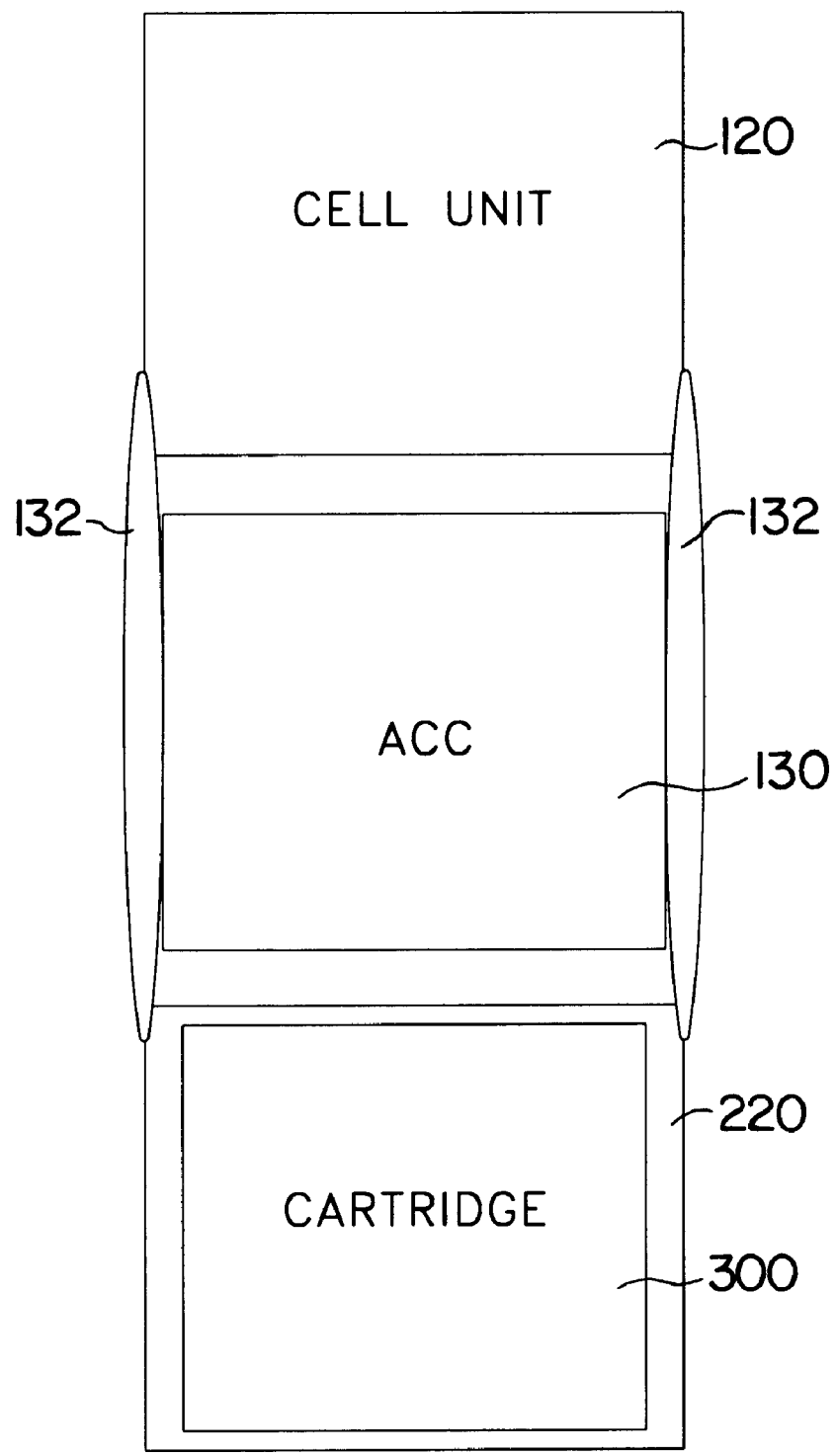
FIG. 17 illustrates the catcher centering operation of the present invention.

In step SB14, if a decision about the generation of errors in the transfer of the cartridge 300 is "Yes," the process in step SB17 (error notification) is executed. If the decision in step SB14 is "No," then in step SB15, the catcher motor 131 (see FIG. 2) is activated to execute a "catcher centering" operation for making the catcher hands 132, 132 parallel, as shown in FIG. 17. In step SB16, if the decision about the generation of errors in catcher centering is "Yes," the process in step SB17 (error notification) is executed.

If the decision in step SB16 is "No," then going back to step SA13 in FIG. 10, it is decided whether an error was generated in the pressing operation. If the decision is "Yes," the process in step SA18 (error notification) is executed. If the decision in step SA13 is "No," then the "loader down" operation is executed in which the loader 220 loads the cartridge 300 from the transfer position to the read/write position of the threader 230 (step SA14).

In the loader down operation, the cartridge 300 is lowered at an incline to the right from the transfer position (position indicated by the solid line in FIG. 20D) to the read/write position (position indicated by the dashed line in FIG. 20D) and set in the threader 230. Thus, the threader pin latch 303b (shown in FIG. 22) of the leader block 303 now properly engages the threader pin 234 (shown in FIG. 25A), because the leader block 303 is completely latched to the leader block latch 301b.

In step SA15, if a decision about the generation of errors in the loader down operation is "Yes," the process in step SA18 (error notification) is executed. If the decision in step SA15 is "No," then in step SA16, the ACL 100 enters the loading possible state. Specifically, the catcher hands 132, 132 of the ACC 130 are placed in the "catcher closed" state (shown in FIG. 15). In step SA17, if a decision about the generation of errors in the step SA16 process is "Yes," the process in step SA18 (error notification) is executed.

If the decision in step SA17 is "No," the process goes to step SA1 described earlier, where a retry operation is performed to repeat reading from and writing to the cartridge 300. In step SA5, if the number "i" of generated leader block slipping errors exceeds a threshold value of 3, for example, the process in step SA18 (error notification) is executed.

Figure 12A:
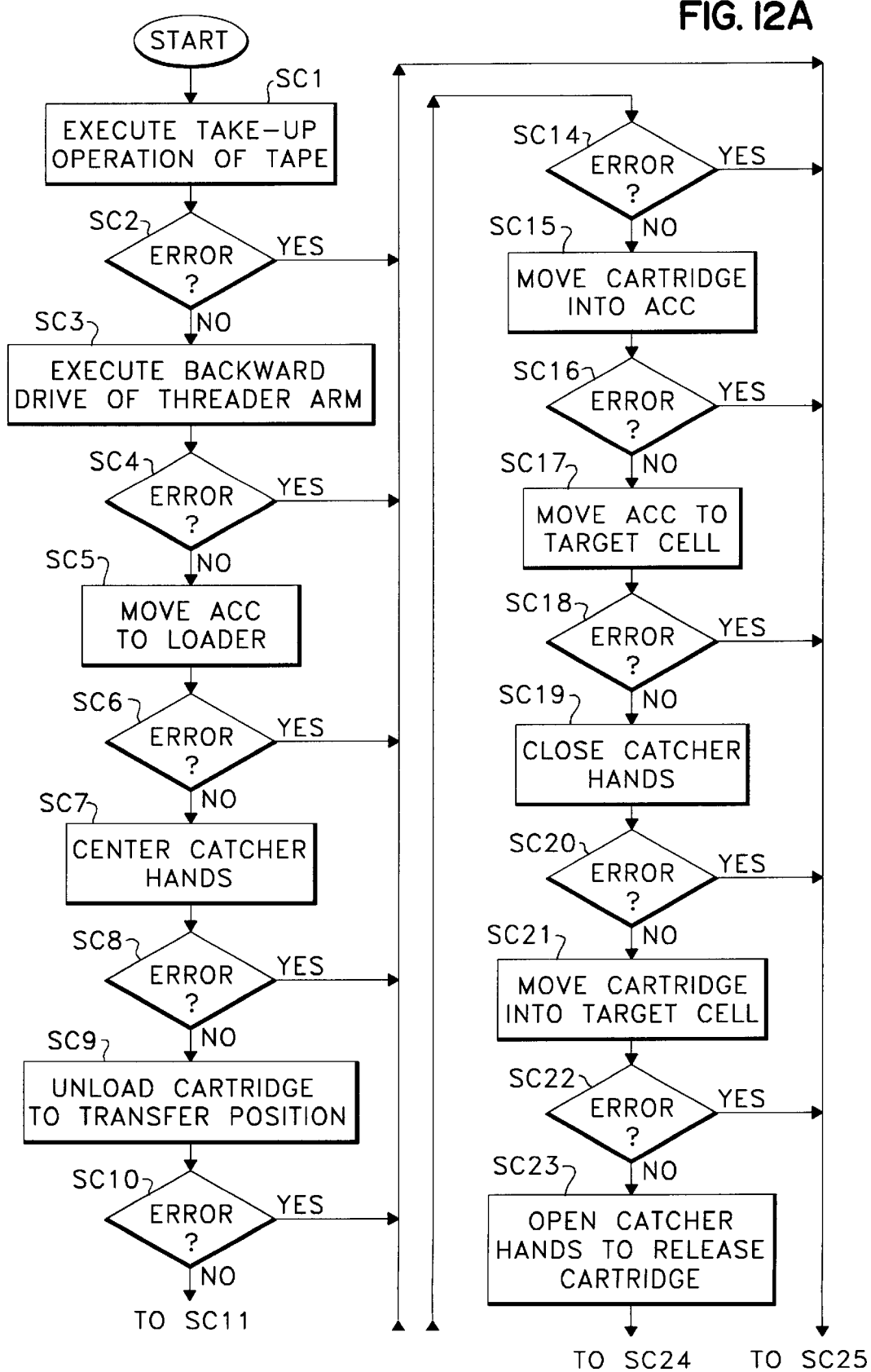
FIGS. 12A and 12B are a flow chart illustrating a cartridge unloading operation.
Figure 12B:
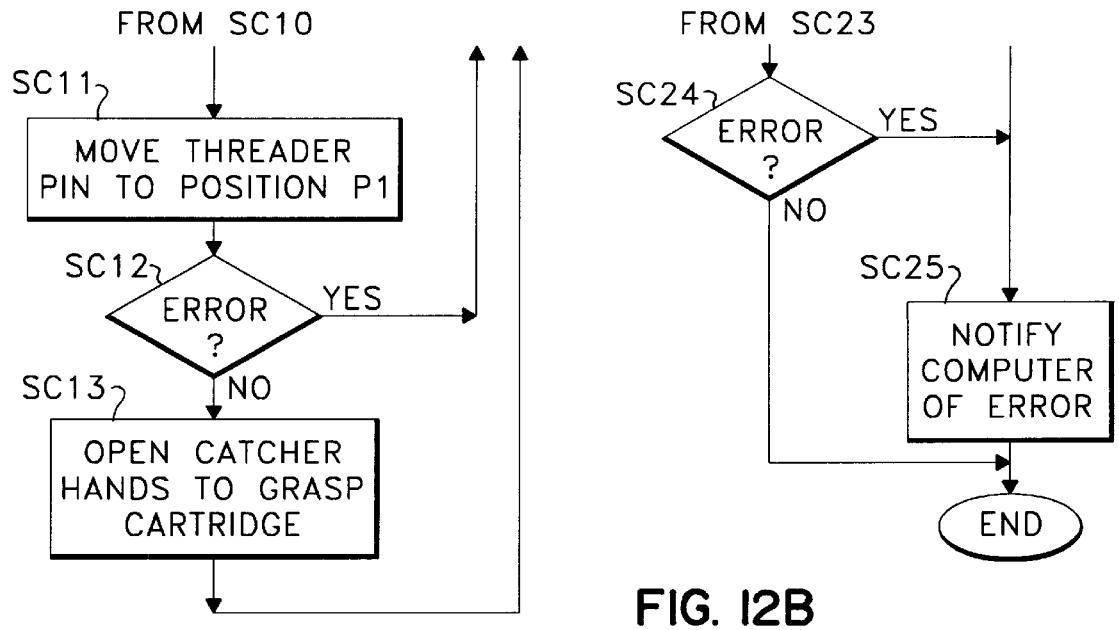
Figure 12:
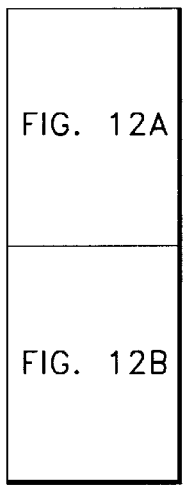
Figure 25B:
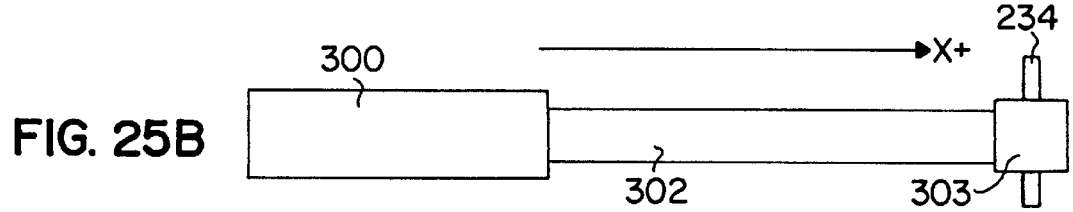
Figure 26A:
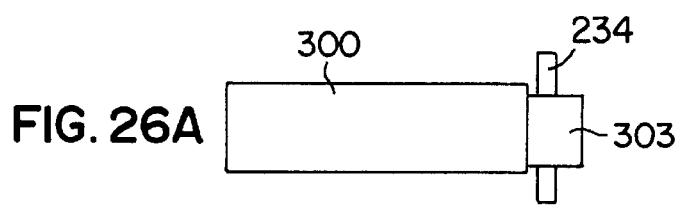
FIGS. 26A–26C illustrate the problem that could occur when the leader block is not properly attached to the tape.
Figure 26B:
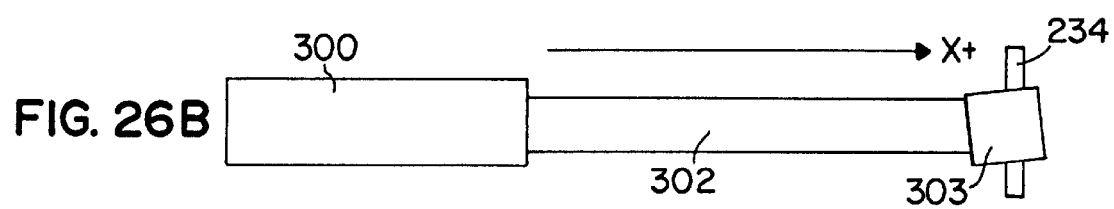
Figure 26C:
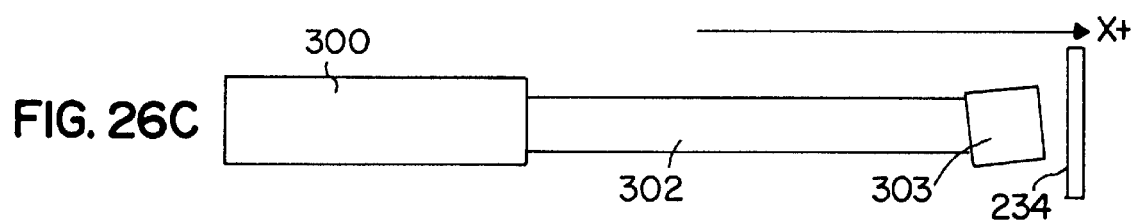

Next, a cartridge unload operation of the embodiment is described with reference to the flow chart of FIGS. 12A and 12B. The unload operation unloads the cartridge 300 in the MTU 200 into the ACL 100 side after the read/write process to the tape 302 ends normally. If the read/write process to the tape 302 ends normally in the state with the cartridge 300 set in the threader 230 as shown in FIG. 25B, a take-up operation in which the tape reel 304 (shown in FIG. 23) is rotated backwards by the motor (not shown) to wind the tape 302 in the cartridge 300 is executed (step SC1). In step SC2 it is decided whether errors are generated in the take-up operation. If this decision is "Yes," then in step SC25, the computer is notified of the generation of the error.

If the decision in step SC2 is "No," then a backward drive is executed to drive the threader arm 233 (and the threader pin 234) in the backward direction B along the threader groove 232 to a pressing position located slightly before the position $P_1$ (shown in FIG. 9) (step SC3). In step SC4, if a decision about a generation of an error in the backward drive is "Yes," the process in step SC25 (error notification) is executed.

If the decision in step SC4 is "No," the threader pin 234 is moved from the pressing position to the initial position $P_1$. This moves the threader pin 234 in the opposite direction to the X+ direction and winds the tape 302 in the cartridge 300 as in FIG. 25A. The threader pin 234 is stopped at the pressing position, and the motor (not shown) that drives the rotation of the tape reel 304 (shown in FIG. 23) also stops. Strongly pressing the leader block 303 with the threader pin 234 against the cartridge 300 (as shown in FIG. 25A) fully latches the leader block 303 to the leader block latch 301b (shown in FIG. 23).

Thus, this embodiment solves the conventional problem of the driving force of the motor (not shown) for driving the tape reel 304 being weakened by deterioration over time. The pressing position is set at a position where a force which will not bend the threader pin 234 or damage the part fixed to the threader pin 234 acts on the leader block 303.

In step SC5, the ACC 130 is moved in the Y direction (upward) as in FIG. 19 along the shaft 140 (shown in FIG. 3) and stopped at the position opposite the loader 220. In this case, the cartridge 300 is not held in the ACC 130. In step SC6, if a decision about a generation of errors during ACC 130 motion is "Yes," the process in step SC25 (error notification) is executed. If the decision in step SC6 is "No," a catcher centering operation is executed to make the catcher hands 132, 132 parallel, as in FIG. 17, by rotating the catcher motor 131 (step SC7). In step SC8, if a decision about a generation of errors in the catcher centering operation is "Yes," the process in step SC25 (error notification) is executed.

If the decision in the step SC8 is "No," then similar to step SA8 (see FIG. 10), a "loader up" operation which unloads the cartridge 300 from the read/write position to the transfer position is executed (step SC9). In step SC10, if a decision about a generation of errors in the loader up operation is "Yes," the process in step SC25 (error notification) is executed. If the decision in step SC10 is "No," a home position drive is executed to move the threader pin 234 from the pressing position described earlier to the initial position $P_1$ (home position) by driving the threader arm 233 (best shown in FIG. 9) (step SC11).

In step SC12, if a decision about a generation of errors in the home position drive is "Yes," the process of the step SC25 (error notification) is executed. If the decision in step SC12 is "No," then in step SC13, a reverse rotation drive by the catcher motor 131 places the catcher hands 132, 132 in the catcher open state (open on the cell unit 120 side) as in FIG. 16, and the cartridge 300 in the loader 220 is grasped by the catcher hands 132, 132.

In step SC14, if a decision about a generation of errors in opening the catcher is "Yes," the process in step SC25 (error notification) is executed. If the decision in step SC14 is "No," then in step SC15, the rotation of the feeder belt (not shown) causes a frictional force to act between the feeder belts and the cartridge 300. As a result, the cartridge 300 in the loader 220 is transferred in the XB direction (the direction of the cell unit 120) as in FIG. 16 and held in the ACC 130.

In step SC16, if a decision about a generation of errors in the transfer of the cartridge 300 is "Yes," the process in step SC25 (error notification) is executed. If the decision in step SC16 is "No," then in step SC17, the ACC 130 is moved in the Y direction (downward) as in FIG. 18 along the shaft 140 (shown in FIG. 3) and is stopped at the position opposite the target cell 121B, for example.

In step SC18, if a decision about a generation of errors in the motion of the ACC 130 is "Yes," the process in step SC25 (error notification) is executed. If the decision in step SC18 is "No," then in step SC19, the catcher motor 131 is driven to rotate forward to place the catcher hands 132, 132 in the catcher closed state (closed on the cell unit 120 side) as in FIG. 15.

In step SC20, if a decision about a generation of errors in closing the catcher is "Yes," the process in step SC25 (error notification) is executed. If the decision in step SC20 is "No," then in step SC21, the drive of the feeder belt transfers the cartridge 300 in the opposite direction to the XA direction (cell 121B side) as shown FIG. 18. This stores the cartridge 300 in the cell 121B.

In step SC22, if a decision about a generation of errors in the transfer of a cartridge 300 is "Yes," the process of the step SC25 (error notification) is executed. If the decision in step SC22 is "No," then in step SC23, the reverse rotation drive by the catcher motor 131 (shown in FIG. 2) places the catcher hands 132, 132 in the catcher open state (open on the cell unit 120 side) as in FIG. 16 to release the cartridge 300 from the catcher hands 132, 132.

In step SC24, if a decision about a generation of errors when opening the catcher is "Yes," the process in step SC25

(error notification) is executed. If the decision in step SC24 is "No," the sequence of processes ends.

While the principles of the invention have been described above in connection with specific apparatus and applications, it is to be understood that this description is made only by way of example and not as a limitation on the scope of the invention.

What is claimed is:

1. A library apparatus adapted to write to and read from a plurality of cartridges each housing a tape wound around a reel, each tape having a leader block attached to a tip thereof for pulling the tape out of the cartridges and adapted to be seated in a latch provided on the cartridge, said library apparatus comprising:

a cell unit having a plurality of cells adapted to store the tape cartridges;

a threader unit for writing data to and/or reading data from a selected cartridge, said threader unit having means for engaging a leader block of a tape housed in said selected cartridge to pull said tape out of said selected cartridge for writing and/or reading data on said tape;

loading means connected to said threader unit for holding said selected cartridge in a first position where said engaging means is prevented from engaging said leader block of said selected cartridge, and a second position where said engaging means is allowed to engage said leader block, wherein said loading means is integrally assembled with said threader unit as a complete unit;

a computer for providing commands, wherein when an error related to alignment of said leader block with said latch has been detected, said computer issues a command that interrupts said loading means from moving said selected cartridge from said first position to said second position; and an accessor for transferring said selected cartridge between said cell unit and said first position of said loading means.

2. A library apparatus adapted to write to and read from a plurality of cartridges each housing a tape wound around a reel, each tape having a leader block attached to a tip thereof for pulling the tape out of the cartridges and adapted to be seated in a latch provided on the cartridge, said library apparatus comprising:

a cell unit having a plurality of cells adapted to store the tape cartridges;

a threader unit for writing data to and/or reading data from a selected cartridge, said threader unit having means for engaging a leader block of a tape housed in said selected cartridge to pull said tape out of said selected cartridge for writing and/or reading data on said tape;

loading means connected to said threader unit for holding said selected cartridge in a first position where said engaging means is prevented from engaging said leader block of said selected cartridge, and a second position where said engaging means is allowed to engage said leader block, wherein said loading means is integrally assembled with said threader unit as a complete unit;

an accessor for transferring said selected cartridge between said cell unit and said first position of said loading means;

means for determining whether said engaging means has properly engaged said leader block of said selected cartridge in said second position; and means for pressing said leader block into proper alignment when said determining means determines that said engaging means has not properly engaged said leader block, said means for pressing only being utilized after said means for determining has determined that said engaging means has not properly engaged said leader block.

3. The library apparatus as defined in claim 2 wherein said selected cartridge is retrieved from said loading means by said accessor and transferred to said pressing means when said determining means determines that said engaging means has not properly engaged said leader block, and said leader block is pressed against said pressing means for aligning said leader block relative to said engaging means.

4. The library apparatus as defined in claim 3 wherein said pressing means is configured and adapted to push said leader block into a latch of said selected cartridge.

5. The library apparatus as defined in claim 3 wherein said pressing means is located in said cell unit opposite an opening of a selected cell.

6. A method for correcting an alignment of a leader block attached to a tip of a tape wound around a reel and housed in a tape cartridge, when the cartridge is inserted in a library apparatus adapted to write to and read from the tape, the library apparatus having a cell unit including a plurality of cells adapted to store a plurality of tape cartridges, a tape unit for writing data to and/or reading data from a selected cartridge, the tape unit including a pin for engaging the leader block of the tape housed in the cartridge to pull the tape out of the cartridge for writing and/or reading data on the tape, and an accessor for transferring the cartridge between the cell unit and the tape unit, said method comprising the steps of:

determining whether the engaging pin has properly engaged the leader block of the tape when the selected cartridge is inserted in the tape unit;

withdrawing the cartridge from the tape unit when it is determined that the engaging pin has not properly engaged the leader block;

moving the cartridge to a predetermined position where the leader block is pressed against a stationary pressing member so that the leader block is seated in a latch provided on the cartridge; and inserting the cartridge back in the tape unit and engaging the pin with the leader block, wherein:

during said moving step, the cartridge is moved in a first direction to press the leader block against the stationary pressing device; and during said inserting step, the cartridge is moved in a second direction, where said second direction is substantially parallel to said first direction.

7. The method as defined in claim 6, wherein the cartridge is withdrawn from and inserted in a first position in the tape unit where the pin is prevented from engaging the leader block, and placed in a second position where the pin is allowed to engage the leader block for writing and reading from the tape.

8. A library apparatus adapted to write to and read from a plurality of cartridges each housing a tape wound around a reel, each tape having a leader block attached to a tip thereof for pulling the tape out of the cartridges and adapted to be seated in a latch provided on the cartridge, said library apparatus comprising:

a cell unit having a plurality of cells adapted to store the tape cartridges;

a threader unit for writing data to and/or reading data from a selected cartridge, said threader unit having means for engaging a leader block of a tape housed in said selected cartridge to pull said tape out of said selected cartridge for writing and/or reading data on said tape;

means for determining whether said engaging means has properly engaged said leader block of said selected cartridge;

means for pressing said leader block into proper alignment when said determining means determines that said engaging means has not properly engaged said leader block; and an accessor for transferring said selected cartridge between said cell unit and said threader unit, and between said threader unit and said pressing means, wherein said accessor moves said selected cartridge in a first direction when inserting said selected cartridge into said threader unit, and further wherein said accessor moves said selected cartridge in a second direction when pressing said selected cartridge against said pressing means, where said second direction is substantially parallel to said first direction.

9. The library apparatus as defined in claim 8 wherein said selected cartridge is retrieved from said threader unit by said accessor and transferred to said pressing means when said determining means determines that said engaging means has not properly engaged said leader block, and said leader block is pressed against said pressing means for aligning said leader block relative to said engaging means.

10. The library apparatus as defined in claim 9 wherein said pressing means is configured and adapted to push said leader block into a latch of said selected cartridge.

11. The library apparatus as defined in claim 9 wherein said pressing means is located in said cell unit directly opposite an opening of a selected cell.

12. The method as defined in claim 6, wherein during said moving step, the leader block is pressed against the stationary pressing member by a pressing force created by moving the cartridge towards the stationary pressing member along a substantially straight line.

13. The library apparatus as defined in claim 1, further comprising:

means for pressing said leader block into proper alignment with said latch, wherein when said computer issues said command to interrupt said threader unit from moving said selected cartridge from said first position to said second position, said computer also issues a command for moving said selected cartridge to perform a pressing operation with said means for pressing.

* * * * *